June 2, 1964     T. N. PERRY ETAL     3,135,061
DRAGLINE CUTTER RAKE DEVICE
Filed July 25, 1962
FIG. 1
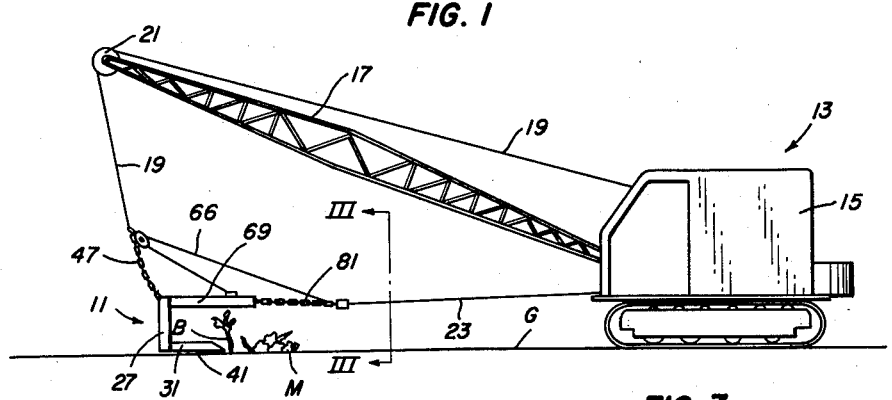
FIG. 2     FIG. 3
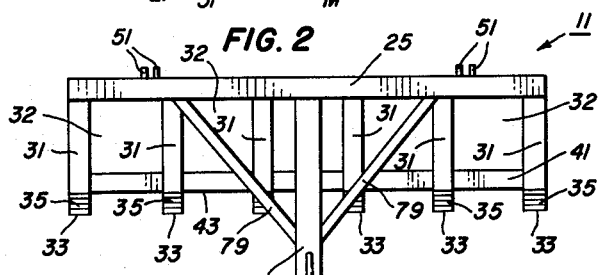
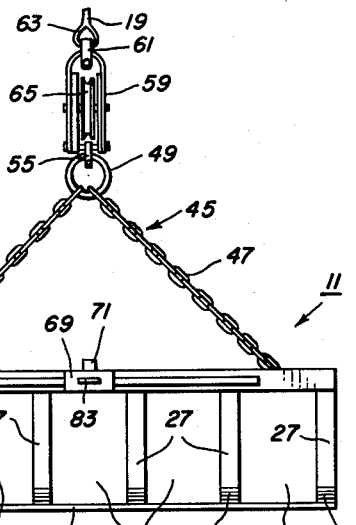
FIG. 4
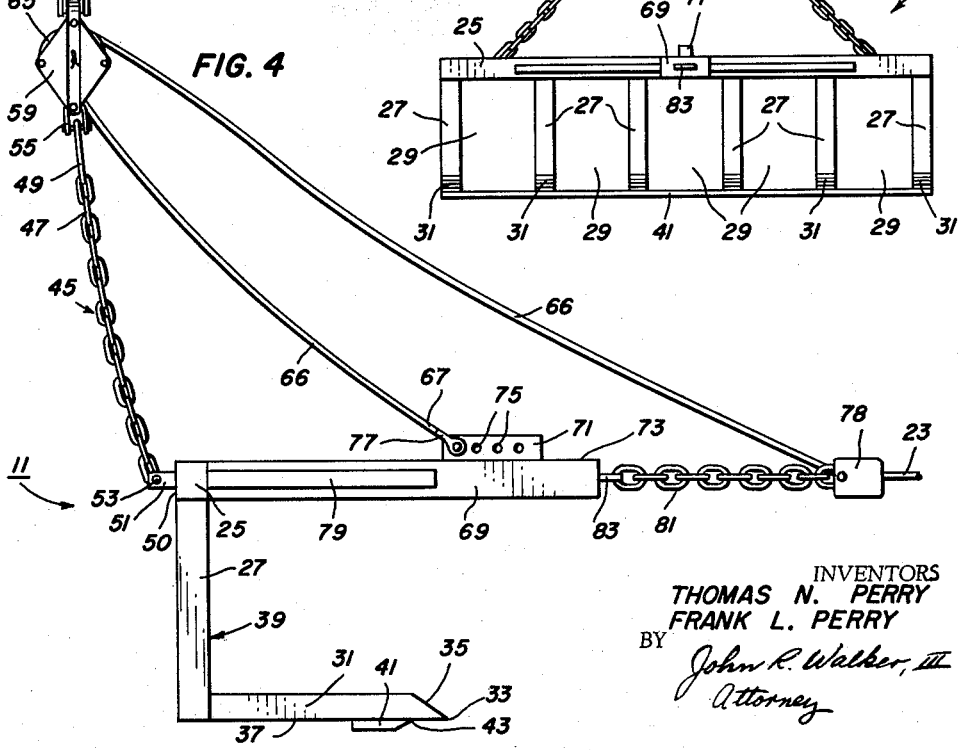
INVENTORS
THOMAS N. PERRY
FRANK L. PERRY
BY John R. Walker, III
Attorney – # United States Patent Office 3,135,061
Patented June 2, 1964

3,135,061
DRAGLINE CUTTER RAKE DEVICE
Thomas N. Perry, P.O. Box 152, Highway 8 E., and Frank L. Perry, 520 S. Victoria St., both of Cleveland, Miss.
Filed July 25, 1962, Ser. No. 212,384
5 Claims. (Cl. 37—116)

This invention relates to a cutter rake device adapted to be used with dragline apparatus.

The present invention is useful in cutting and raking small brush and the like and for clearing land. It is particularly useful in clearing ditch banks of brush, logs, debris, etc. where tractors and bulldozers cannot operate. Heretofore, in clearing brush, logs, debris, etc. from such ditch banks, it was necessary to do it manually.

Thus, one of the objects of the present invention is to provide a device which can be used with dragline apparatus to save time and labor in clearing ditch banks and the like.

A further object is to provide such a device that can be used to efficiently and quickly clear land, cut and rake small brush, and perform many other useful tasks.

A further object is to provide such a device that is adapted to be used with existing dragline apparatus and is interchangeable with the dragline buckets, etc.

The means by which the foregoing and other objects of the present invention are accomplished and the manner of their accomplishment will be readily understood from the following specification upon reference to the accompanying drawings, in which:

FIG. 1 is a somewhat schematic side view of dragline apparatus with the dragline cutter rake device of the present invention being used therewith.

FIG. 2 is an enlarged top plan view of the cutter rake device of the present invention, with parts being removed for purposes of illustration.

FIG. 3 is an enlarged fragmentary view taken as on the line III—III of FIG. 1, and with parts being removed for purposes of illustration.

FIG. 4 is a further enlarged view of a portion of the mechanisms shown in FIG. 1.

Referring now to the drawings in which the various parts are indicated by numerals, the cutter rake device 11 of the present invention is adapted to be used with the usual and well-known dragline apparatus, as for example, like that shown in FIG. 1, wherein it will be seen the dragline apparatus 13 comprises the usual cab 15 having a boom 17 extending therefrom. The usual hoist cable 19 is suspended from adjacent the end of boom 17 by the usual pulley 21, and from the pulley the cable extends back to the usual drum or the like, not shown, on cab 15, which is controlled in the usual manner to let out and pull in cable 19. In addition, the usual drag cable 23 is provided, which also leads back to a drum or the like, not shown, mounted on cab 15 for pulling in and letting out on the cable. For purposes of clarity, and not by way of limitation, the forward end of apparatus 13 and device 11 is that end to the left as viewed in FIGS. 1 and 4.

Referring now particularly to cutter device 11, it comprises a transverse bar 25 and a plurality of laterally spaced supports 27 that are fixedly attached by suitable means to transverse bar 25 along the length thereof and depend therefrom. The spaces 29 between supports 27 are preferably, though not necessarily, equal. In addition, a plurality of prongs 31 are respectively fixedly attached to supports 27 adjacent the lower ends thereof and respectively extend substantially perpendicularly from the supports in substantially parallel spaced relationship with spaces 32 being therebetween. In other words, at the lower end of each of supports 27 a prong 31 perpendicularly extends therefrom. Prongs 31 are respectively sharpened adjacent the distal ends thereof, as at 33, with the sharpening preferably being done downwardly, that is, the end 35 of each prong being sloped downwardly and rearwardly and with the actual sharpened end or edge being adjacent the lower part of the prong at the juncture between the lower surface 37 of the prong and end 35. The above mentioned parts, that is, transverse bar 25, supports 27, and prongs 31 are rigidly interconnected so that a rigid rake-like member 39 is established.

A cutter bit 41 is fixedly attached to the respective prongs 31 on the lower surfaces 37 thereof and adjacent the sharpened ends 33 thereof. Cutter bit 41 extends transversely of cutter rake device 11 and is sharpened adjacent the rearward or leading edge 43 of the cutter bit. It should be pointed out that the leading edge is actually the rearward edge since device 11 is pulled rearwardly, as will be better understood in the description of the operation of the device to follow later in the specification.

A bridle 45 is attached to rake-like member 39 and the bridle preferably comprises a pair of chains 47 that are respectively coupled to a ring 49 adjacent the upper ends thereof and diverge downwardly where the chains are coupled to transverse bar 25 in spaced relationship and on the forward side 50 thereof by suitable means, as by lugs 51 fixedly attached to transverse bar 25 and pins 53 extending through aligned apertures in the lugs and through a link in the chain. It should be noted that the bridle 45 is so arranged that rake-like member 39 is laterally balanced, and transverse bar 25 will remain substantially horizontal, as viewed in FIG. 3, when supported by the bridle.

Bridle 45 is coupled to the end of cable 19 by suitable means, which preferably includes a shackle 55 coupling ring 49 to the lower end of a pulley block 59 and a shackle 61 coupled to the upper end of the pulley block and to and eyelet 63 coupled to the lower end of cable 19. It will be understood that other coupling means for coupling bridle 45 to cable 19 may be used without departing from the spirit and scope of the present invention.

A pulley 65 is rotatably mounted in pulley block 59 and is engaged by a dump cable 66, which is arranged in a manner similar to the dump cable when a dragline bucket is used. Thus, the end 67 of dump cable 66 is fixedly attached by suitable means to a tongue 69 mounted on rake-like member 39. The means of attaching the end 67 of cable 23 is preferably by a plate 71 fixedly attached to the upper side 73 of tongue 69 and provided with a plurality of spaced apertures 75 therethrough with the end of the cable being attached in a selected one of the apertures 75 by means of a shackle 77, or other suitable means. The cable 66 extends from its attachment with tongue 69 through pulley 65 and to its attachment with a connecting device 78, as a crow's foot socket or the like. Tongue 69 is rigid and is attached adjacent the forward end thereof to transverse bar 25 and projects rearwardly therefrom above prongs 31 in spaced parallel relationship thereto. The point of attachment of tongue 69 to transverse bar 25, as above described, is preferably halfway between the opposite ends of transverse bar 25 and the tongue preferably projects beyond the ends of the prongs 31, as best seen in FIGS. 1, 2, and 4. A pair of diagonal braces 79 preferably extend between the tongue and transverse bar 25 to add rigidity to the structure.

A chain 81 is coupled adjacent one end to the distal or rearward end of tongue 69 by suitable means, as an eyelet 83. The opposite end of chain 81 is fixedly coupled to cable 23 by connecting device 78, which interconnects cables 23, 66 and chain 81 in the usual manner.

In using the cutter rake device 11, it is manipulated in substantially the same manner as a dragline bucket or the like. Thus, lift cable 19 is used in general to lift and/or pull the device 11 forwardly, or to the left as viewed in FIGS. 1 and 4, and drag cable 23 is used to pull or drag the device 11 rearwardly towards the cab 15. Thus, in the example shown in FIG. 1, the device 11 has been lowered onto the ground G and it is in position to be pulled towards the cab by drag cable 23. It will be understood that the pull on the device 11 will be exerted through drag cable 23 and chain 81. Also, it will be understood that as the device 11 is pulled, the cutter bit 41 will come in contact with small brush and the like, such as that represented as at B, and will cut the brush down near the ground. In addition, it will be understood that the rake-like member 39 will rake up materials such as that shown at M in FIG. 1, and the material will be raked up onto the prongs 31. The dirt and the like will be allowed to remain on the ground since it will pass through the spaces 29 between the supports 27 and the spaces 32 between the prongs 31. After the material M or the like has been raked up, the cables 19 and 23 are manipulated so that the device 11 can be suspended from the ground by cable 19 and swung by boom 17 to the desired location for dumping. It will be understood that an upward pull is exerted on tongue 69 by dump cable 66 to keep the tongue and prongs 31 substantially horizontal. When it is desired to dump the material M or the like, with the device 11 out near the end of boom 17, the pulling cable 23 is slackened and the tongue 69 allowed to rotate clockwise, as viewed in FIGS. 1 and 4, so that the material is dumped.

From the foregoing it will be understood that a very useful and efficient device 11 is provided for use in cutting brush and the like and for clearing land. In addition, it can be seen that the device is particularly useful in clearing ditch banks of brush, logs, debris, etc. where tractors and bulldozers cannot operate, since the boom 17 can be swung out over the ditch and the device 11 dropped down and then dragged by means of drag cable 23 to rake the ditch.

Although the invention has been described and illustrated with respect to a preferred embodiment thereof, it is to be understood that it is not to be so limited since changes and modifications may be made therein which are within the full intended scope of this invention as hereinafter claimed.

We claim:

1. In a dragline apparatus of the type including a swingable boom, a lift cable suspended from said boom for movement therewith, and a drag cable; a cutter rake device comprising a substantially entirely open rake-like member provided with a plurality of spaces through the front and bottom thereof adapted to pass dirt therethrough and including a plurality of prongs, a cutter bit having a sharpened leading edge, said cutter bit being fixedly attached to said prongs, means coupling said lift cable to said rake-like member whereby said rake device is adapted to be manipulated by said lift cable and swung by said boom acting through said lift cable, a tongue attached to said rake-like member and extending above said prongs, said cutter rake device being unobstructed from side to side in the space between said prongs and said tongue and being open at the rear and sides thereof whereby objects longer than the width of said rake device can be carried transversely of said rake device on said prongs, means attached to said tongue for maintaining said prongs in a normally substantially horizontal position, means coupling said tongue to said drag cable whereby said cutter rake is adapted to be manipulated by said drag cable in conjunction with said lift cable to cut and rake small brush and the like and perform other useful tasks.

2. A dragline cutter rake device adapted to be used with dragline apparatus of the type including a swingable boom, a lift cable suspended from said boom for movement therewith, and a drag cable; said rake device comprising a substantially entirely open rake-like member provided with a plurality of spaces through the front and bottom thereof adapted to pass dirt therethrough and including a plurality of prongs, a cutter bit having a sharpened leading edge, said cutter bit being fixedly attached to said prongs, means attached to said rake device and adapted to be attached to said lift cable whereby said rake device is adapted to be manipulated by said lift cable and swung by said boom acting through said lift cable, means attached to said rake-like member for maintaining said prongs in a normally substantially horizontal position, and means attached to said rake device and adapted to couple said drag cable thereto whereby said cutter rake is adapted to be manipulated by said drag cable in conjunction with said lift cable to cut and rake small brush and the like and perform other useful tasks, said rake device being unobstructed from side to side in the space between said prongs and said last mentioned means and being open at the rear and sides thereof whereby objects longer than the width of said rake device can be carried transversely of said rake device on said prongs.

3. A dragline cutter rake device adapted to be used with dragline apparatus of the type including a swingable boom, a lift cable suspended from said boom for movement therewith, and a drag cable; said rake device comprising a transverse bar, a plurality of laterally spaced supports fixedly attached to said transverse bar along the length thereof and depending therefrom, a plurality of prongs respectively fixedly attached to said supports adjacent the lower ends thereof and respectively extending substantially perpendicularly therefrom in substantially parallel spaced relationship, said rake device being substantially entirely open between said supports and said prongs to pass dirt and the like therethrough, said prongs respectively being provided with distal sharpened ends, a cutter bit having a sharpened leading edge, said cutter bit being fixedly attached to said prongs on the undersides thereof with said cutter bit extending transversely of said rake device in substantially parallel relationship relative to said bar, a tongue fixedly attached to said bar intermediate the ends of said bar and extending substantially perpendicularly thereto and above said prongs, said rake device being unobstructed from side to side in the space between said prongs and said tongue and being open at the rear and sides thereof whereby objects longer than the width of said rake device can be carried transversely of said rake device on said prongs, a bridle fixedly attached to said transverse bar, means attached to said bridle and adapted to be attached to said lift cable for coupling said lift cable to said rake device whereby said rake device is adapted to be manipulated by said lift cable and swung by said boom acting through said lift cable, a pulley attached to said rake device adjacent the upper end of said bridle, a connecting device, a dump cable extending through said pulley and connected adjacent one end to said tongue and connected adjacent the opposite end to said connecting device, chain means interconnecting said connecting device and said tongue, said connecting device being adapted to be connected to said drag cable adjacent the end thereof, whereby said cutter rake is adapted to be manipulated by said drag cable in conjunction with said lift cable to cut, rake and dump small brush and the like and perform other useful tasks.

4. In a dragline apparatus of the type including a swingable boom, a lift cable suspended from said boom for movement therewith, and a drag cable; a cutter rake device comprising a transverse bar, a plurality of laterally spaced supports fixedly attached to said transverse bar along the length thereof and depending therefrom, a plurality of prongs respectively fixed attached to said supports adjacent the lower ends thereof and respectively extending substantially perpendicularly therefrom in substantially parallel spaced relationship, said rake device being substantially entirely open between said supports and said prongs to pass dirt and the like therethrough, said prongs respectively being provided with distal sharpened ends, a cutter bit having a sharpened leading edge, said cutter bit being fixedly attached to said prongs on the undersides thereof with said cutter bit extending transversely of said rake device in substantially parallel relationship to said bar, a tongue fixedly attached to said bar intermediate the ends of said bar and extending substantially perpendicularly thereto and above said prongs, said rake device being unobstructed from side to side in the space between said prongs and said tongue and being open at the rear and sides thereof whereby objects longer than the width of said rake device can be carried transversely of said rake device on said prongs, a bridle fixedly attached to said transverse bar, means coupling said lift cable to said bridle whereby said rake device is adapted to be manipulated by said lift cable and swung by said boom acting through said lift cable, a pulley attached to said rake device adjacent the upper end of said bridle, a dump cable having one end attached to said tongue and extending through said pulley towards the opposite end of said dump cable from said attached end, means coupling said drag cable to said tongue and to said dump cable adjacent said opposite end of said dump cable, whereby said cutter rake is adapted to be manipulated by said drag cable in conjunction with said lift cable and said dump cable to cut, rake and dump small brush and the like and perform other useful tasks.

5. In a dragline apparatus of the type including a swingable boom, a lift cable suspended from said boom for movement therewith, and a drag cable; a rake device comprising a transverse bar, a plurality of laterally spaced supports fixedly attached to said transverse bar along the length thereof and depending therefrom, a plurality of prongs respectively fixedly attached to said supports adjacent the lower ends thereof and respectively extending substantially perpendicularly therefrom in substantially parallel spaced relationship, said rake device being substantially entirely open between said supports and between said prongs to pass dirt and the like therethrough, said prongs respectively being provided with distal sharpened ends, a tongue fixedly attached to said bar intermediate the ends of said bar and extending substantially perpendicularly thereto and above said prongs, said rake device being unobstructed from side to side in the space between said prongs and said tongue and being open at the rear and sides thereof whereby objects longer than the width of said rake device can be carried transversely of said rake device on said prongs, a bridle fixedly attached to said transverse bar, means coupling said lift cable to said bridle whereby said rake device is adapted to be manipulated by said lift cable and swung by said boom acting through said lift cable, a pulley attached to said rake device adjacent the upper end of said bridle, a dump cable having one end attached to said tongue and extending through said pulley towards the opposite end of said dump cable from said attached end, means coupling said drag cable to said tongue and to said dump cable adjacent said opposite end of said dump cable, whereby said cutter rake is adapted to be manipulated by said drag cable in conjunction with said lift cable to rake and dump small brush and the like and perform other useful tasks.

References Cited in the file of this patent
UNITED STATES PATENTS

| | | |
|---|---|---|
| 1,304,445 | Blewett | May 20, 1919 |
| 2,050,133 | Smith | Aug. 4, 1936 |
| 2,129,955 | Olson | Sept. 13, 1938 |
| 2,338,831 | Whitcomb | Jan. 11, 1944 |
| 3,021,619 | McGee | Feb. 20, 1962 |